United States Patent Office 2,732,831
Patented Jan. 31, 1956

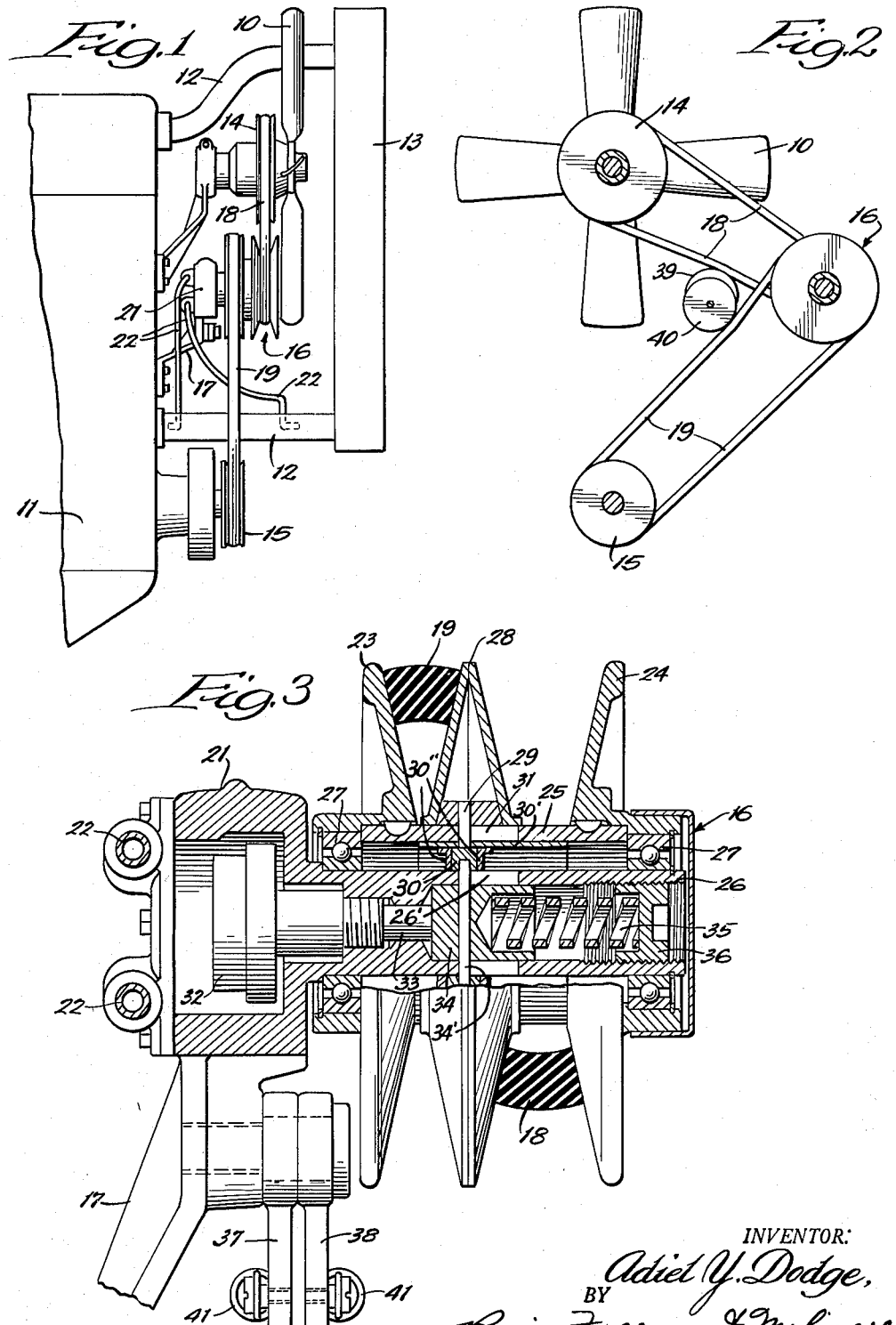

2,732,831
VARIABLE SPEED DRIVES

Adiel Y. Dodge, Rockford, Ill.

Application July 28, 1952, Serial No. 301,234

3 Claims. (Cl. 123—41.12)

This invention relates to variable speed drives, and more particularly to a variable speed V belt drive mechanism for use in driving cooling fans of internal combustion engines and the like.

Variable speed V belt drives are used effectively to vary the driving ratio between driving and driven shafts. For example, in driving the cooling fans of internal combustion engines, such devices normally include two variable diameter pulleys one of which is controlled to effect speed variations and the other of which is spring urged into engagement with the belt to yield in response to belt pressure produced by the controlled pulley.

With this type of drive relatively high pressures are developed on the sides of the pulley and as a result relatively large control forces are required to effect variations in the driving ratio. For engine fan drives this means either that relatively large and powerful thermostats are required to change the ratio or that some type of force multiplying mechanism must be used. Furthermore, conversion of existing engines equipped with fixed speed fan drive pulleys is difficult and expensive and requires removal and complete replacement of the existing pulleys.

It is one of the objects of the present invention to provide a variable speed drive in which the side pressures on the variable pulleys are balanced so that the driving ratio can be controlled with a relatively small controlling force.

Another object of the invention is to provide a variable speed drive in which driving and driven pulleys of fixed diameter are connected respectively to variable pulleys, the moving parts of which are interconnected to balance the belt pressures thereon.

According to one feature of the invention the variable pulleys include conical end members secured rigidly together and an intermediate double coned member shiftable axially to vary the effective pulley diameters simultaneously in opposite directions.

A further object is to provide a variable speed drive in which a relatively small thermostatic control device is connected directly to the adjustable parts of the variable pulleys to control the driving ratio.

A still further object is to provide a variable speed drive which can be installed easily and simply on an existing engine to drive the fan thereof with a minimum number of changes in the existing engine and fan parts.

The above and other objects of the invention will be more readily apparent from the following description when read in connection with the accompanying drawing, in which Figure 1 is a partial side elevation of an engine fan drive embodying the invention, Figure 2 is a partial end elevation showing the fan driving parts, and Figure 3 is an enlarged section through the variable pulley construction.

As illustrated in Figure 1, the invention is applied to the drive of a cooling fan 10 of an internal combustion engine 11 provided with water jackets connected through hoses 12 to a conventional cooling radiator 13. The fan 10 is mounted immediately to the rear of the cooling radiator and is provided with a V pulley 14 through which it is driven. Driving power for the fan is derived from a V pulley 15 driven by the engine and projecting from the front thereof.

According to the present invention, the driving and driven pulleys 15 and 14 are of fixed diameter and are interconnected through an intermediate variable pulley construction indicated generally at 16. The variable pulley construction is supported by a bracket 17 on the front of the engine in a position between the pulleys 14 and 15, and is connected respectively to the pulleys 14 and 15 by belts 18 and 19. The bracket 17 carries a thermostat housing 21 which is connected through hoses 22 to spaced points in the return water connection 12 from the lower part of the radiator to the engine, so that a portion of the cooling liquid flowing from the radiator to the engine will flow through the thermostat housing 21. If desired to insure proper flow a restriction may be provided in the lower hose coupling between the points of connection of the conduits 22 thereto.

As best seen in Figure 3, the intermediate variable pulley construction comprises a pair of conical end members 23 and 24 fixedly secured to a sleeve 25 with their conical surfaces facing each other. The sleeve 25 is rotatably mounted on a fixed stub shaft 26 through bearings 27. Between the end members 23 and 24 a double conical part 28 is mounted on the sleeve 25 for axial shifting thereon. The part 28 may be secured to a pin 29 extending through elongated slots 31 in the sleeve 25, so that it will turn with the sleeve but can be shifted axially relative thereto. The belts 18 and 19 fit respectively between the end members and the shiftable part as shown.

In order to shift the part 28 to change the driving ratio between pulleys 14 and 15, a thermostat 32 is mounted within the housing 21 and is connected through a rod 33 with a head 34 in the hollow shaft 26. The head 34 carries a pin 34' which extends through slots 26' in the hollow shaft 26. The pin 34' is connected to a ring 30 held against axial movement in a sleeve 30' by bushings 30" and the pin 29 is secured to the sleeve 30'. Thus shifting of head 34 will shift part 28 but the two can rotate freely relative to each other. The head 34 is preferably urged inward of the shaft by a compression spring 35 seated against an adjustable plug 36 threaded into the end of the shaft.

In order to maintain the belts 18 and 19 properly tensioned under all operating conditions, the bracket 17 preferably carries a pair of pivoted arms 37 and 38, which carry at their outer ends rollers 39 and 40 bearing against the belts 18 and 19 respectively to tension them. Preferably springs 41, as shown in Figure 3, are connected to the arms 37 and 38 to urge them toward the belts when the desired degree of tension.

In operation, when the double conical part 28 is in a central position, the two adjustable pulleys will have the same effective diameter so that the linear speed of the belts 18 and 19 will be equal. At this time the fan will be driven by the pulley 15 at a speed determined solely by the relative diameters of the fixed pulleys 14 and 15. If the temperature of the engine rises, the thermostat will expand, moving the double coned part 28 to the right, thereby decreasing the effective diameter of the left-hand pulley part and increasing the effective diameter of the right-hand pulley part. At this time the belt 18 will have a greater linear speed than the belt 19 to drive the pulley 14 and the fan at increased speed thereby to increase the cooling effect. It will be noted that the thermostat can effect this change by exerting a relatively small force since the side pressures exerted by the belts 18 and 19 on the shiftable double coned member balance each other so that the thermostat must only overcome the tension of the spring 35.

When the water leaving the radiator 13 is relatively cool, the thermostat 32 will contract and move the double coned part to the left to substantially the position shown in Figure 3. In this position, the left-hand pulley which engages the belt 19 is of maximum effective diameter, and the right-hand pulley, which engages the belt 18, is of minimum effective diameter. Thus, the pulley 14 and the fan will be driven at minimum speed to draw a minimum of air through the radiator and to minimize the horse power losses in the fan.

Although the fan is driven at all times with the present mechanism, it will be noted that with a pulley arrangement as disclosed, fan speed can be varied from a maximum to a speed on the order of one-third to one-fourth of full fan speed through the variable pulley construction. At this relatively low speed, little or no power is consumed in driving the fan and wear on the belts and other parts is minimized. It is therefore not believed to be necessary to disconnect the fan entirely since all of the features desired from a variable fan drive can be accomplished with a speed reduction on the order of that contemplated herein.

It will further be noted that adjustment of the fan speed is effected in response to the temperature of the water flowing from the cooling radiator into the engine. This type of control is preferred to a control in response to engine temperature since it is only when the radiator is failing to reduce the water temperature to the desired value that increased fan operation is desirable.

While the invention has been particularly described in connection with the drive of the cooling fan of an engine, it will be apparent that the variable speed drive disclosed herein is equally applicable to other types of variable speed drives. It is therefore not intended that the scope of the invention be limited to the exact disclosure nor otherwise than by the terms of the appended claims.

What is claimed is:

1. A variable fan drive for an engine having inlet and outlet ports for cooling liquid, a radiator, connections from the inlet and outlet ports to spaced points in the radiator for circulation of cooling liquid in a closed circuit through the engine and radiator, and a fan adjacent to the radiator to cause flow of air through it, said variable fan drive comprising fixed diameter V-pulleys connected to the engine and the fan, a double V-pulley including relatively fixed conical end members and a double coned intermediate member between and shiftable axially relative to the end members, belts connecting the opposite halves of the double V-pulley to the fixed diameter pulleys respectively, a hollow thermostat housing mounted adjacent to the double pulley, a spring urging the double diameter pulley toward the housing, an expansible thermostat in the housing connected to the intermediate member to shift it against the spring when the thermostat expands, and conduits connected to the housing and to spaced points in the connection between the radiator and the engine inlet port to cause a circulation of cooling liquid through the housing at a rate proportional to but less than the rate of flow through the engine and radiator and at a temperature equal to the temperature at the radiator outlet.

2. In a variable fan drive, a hollow housing, connections to the housing for circulation of fluid therethrough, an expansible thermostat in the housing, a hollow spindle extending from the housing, a pair of facing end cones mounted on the spindle for rotation but held against relative axial movement, a double convex cone mounted between the end cones for axial shifting relative thereto, a spring acting on the double convex cone urging it toward the thermostat, and a connection between the thermostat and the double convex cone extending through the hollow spindle to move the double convex cone against the spring when the thermostat expands.

3. In a variable fan drive, a hollow housing, connections to the housing for circulation of fluid therethrough, an expansible thermostat in the housing, a hollow spindle extending from the housing, a pair of facing end cones mounted on the spindle for rotation but held against relative axial movement, a double convex cone mounted between the end cones for axial shifting relative thereto, a spring acting on the double convex cone urging it toward the thermostat, a connection between the thermostat and the double convex cone extending through the hollow spindle to move the double convex cone against the spring when the thermostat expands, a pair of fixed diameter V-pulleys, and belts engaging the end cones and opposite faces of the double convex cone and the fixed diameter V-pulleys respectively.

References Cited in the file of this patent

UNITED STATES PATENTS

| | | |
|---|---|---|
| 1,727,950 | Vaughn | Sept. 10, 1929 |
| 1,997,284 | Weston | Apr. 9, 1935 |
| 2,045,870 | Paton | June 30, 1936 |
| 2,472,728 | Sanders | June 7, 1949 |

FOREIGN PATENTS

| | | |
|---|---|---|
| 944,056 | France | Oct. 25, 1948 |